United States Patent Office 2,746,842
Patented May 22, 1956

2,746,842

PRODUCTION OF ALUMINA

Herman S. Bloch, Chicago, and George L. Hervert, Downers Grove, Ill., assignors to Universal Oil Products Company, Des Plaines, Ill., a corporation of Delaware No Drawing. Application January 21, 1954,
Serial No. 405,508

14 Claims. (Cl. 23—143)

This invention relates to the preparation of alumina and more specifically to a method of preparing alumina by the interaction of water and metallic aluminum.

Alumina, either as the hydrate or the anhydrous form as aluminum oxide, is widely used in many phases of the chemical and petroleum industries. It has been employed in the petroleum industry as a catalyst for hydrocarbon conversion processes, as a support for catalytically active materials to be used in hydrocarbon conversion processes and as a dehydrating agent. It is widely used in other industries for the same purposes. The activated forms, which are considered to be merely various physical modifications of aluminum oxide, are especially known for their pronounced catalytic activity and adsorptive capacity. The use of alumina as a refractory is also well known. Alumina in the form of corundum has been found suitable for use in the manufacture of certain types of refractory and ceramic materials. In other uses alumina is mixed or composited with other compounds to produce a wide variety of substances with useful properties.

It is an object of our invention to provide a new process for the production of alumina, and further to produce high purity alumina.

Alumina or aluminum hydrate is present in various modifications. The more common types of anhydrous alumina are as follows:

Alpha-alumina often known as corundum is the form stable at high temperatures.

Gamma-alumina is very stable but changes to alpha-alumina at temperatures above 1800° F.

Epsilon-alumina is the alumina formed in thin films on the surface of metallic aluminum during oxidation by dry or wet air or oxygen.

The following alumina hydrates or aluminum hydroxides are common or may be prepared in the laboratory:

Gamma-$Al_2O_3 \cdot 3H_2O$ or gibbsite is prepared by aging bohmite in a cold basic solution.

Alpha-$Al_2O_3 \cdot 3H_2O$ or bayerite is also formed by aging bohmite in a cold basic solution but is unstable and gradually is transformed into gibbsite.

Gamma-$Al_2O_3 \cdot H_2O$ or bohmite may be prepared in a variety of ways, one of simplest being to add ammonium hydroxide to a water solution of aluminum chloride. The material originally precipitated is thought to be an amorphous alumina flock which rapidly grows in crystal size, yielding crystalline bohmite. Aging bohmite in ammonium hydroxide solution transforms the bohmite first to metastable bayerite and finally to the stable gibbsite.

Alpha-$Al_2O_3 \cdot H_2O$ or diaspore occurs abundantly in nature.

In the specification and claims the word alumina will mean one or more of these various modifications, either as anhydrous alumina or alumina hydrate or aluminum hydroxide unless otherwise specifically noted.

By varying the conditions of the process of this invention it will be shown that some of the various modifications of alumina as hereinbefore described may be obtained.

The usual commercial method of producing alumina is by purifying ores in which the oxide is present. Another method is by the precipitation of aluminum hydroxide from its salts. The preparation of alumina as at present practiced entails the addition of a basic reagent to a solution of aluminum chloride hexahydrate. The resultant precipitate is washed and filtered to remove undesirable impurities. However, in a recently discovered process referred to in the art as "platforming," the catalyst contains very small amounts of activating components. This means that the alumina, which comprises a major proportion of the catalyst, must be thoroughly washed to remove undesirable impurities because the presence of even small amounts of impurities may prove detrimental to the activity and other properties of the catalyst. For example, when the catalyst contains 0.1% to 0.5% of activating components, the presence of impurities within a similar or lesser range of concentration will tend to mask or offset the effect of the activating components.

When alumina is prepared from the commercially available aluminum chloride hexahydrate, the precipitated alumina requires extensive washing and filtering in order to remove the impurities including excess chloride. The present invention offers a novel method of preparing alumina which eliminates the need for washing and filtration and thereby reduces the time and expenses hereinbefore entailed in purifying the alumina.

We have now discovered and our invention broadly comprises an improved method of preparing alumina by reacting aluminum with water under specific conditions. Hydrogen in a very pure state is produced as a by-product of this reaction.

In one embodiment the present invention relates to a method of producing alumina which comprises reacting aluminum with an aqueous solution of an acid, continuing the reaction until at least 15% of the hydrogen which is stoichiometrically equivalent to the amount of acid initially present is evolved, subsequently adding a mercury promoter, effecting further reaction in the presence of said mercury promoter, and separately recovering alumina therefrom.

In another embodiment the present invention relates to a method of producing an alumina sol which comprises reacting aluminum with water at a temperature of from about 30° F. to about 705° F., at a pressure sufficient to maintain at least a portion of the water in the liquid phase, continuing the reaction until at least 15% of the hydrogen which is stoichiometrically equivalent to the amount of acid initially present is evolved, subsequently adding a mercury promoter in the amount of from about 0.05% to about 50% by weight of said aluminum and effecting further reaction in the presence of said mercury promoter.

The aluminum to be used in our process can be any substantially pure aluminum, although if a high purity alumina product is desired it is preferable to start with high purity aluminum. It is also within the scope of this invention to use certain aluminum alloys; however, since the present process will produce a very pure alumina, it is a preferred embodiment of the present invention to react aluminum of preferably 99.5+% purity with water to produce a high purity alumina product. The presence of some alloying elements is undesirable, since they appear to inhibit the reaction of aluminum with water.

The degree of subdivision of the aluminum is also another factor determining the rate of the reaction. The smaller the size of the particles, the greater the surface area of aluminum exposed to the water for reaction; a powdered aluminum, if not overly oxidized, is therefore excellent. Granulated or pelleted aluminum, or aluminum in ribbon form is also suitable; however, the larger the particle size of the aluminum metal charge the longer the time required for complete reaction. In general, pellicles of not more that about an inch in greatest dimension are satisfactory, although those of less than about ½ inch average size are preferred. Aluminum pellets prepared by dropping molten aluminum into water have proven to be very satisfactory for producing alumina by the process of our invention.

The epsilon-alumina which forms rapidly on aluminum surfaces and acts as a coating which normally passivates aluminum does not effectively inhibit reaction under the conditions herein disclosed.

One embodiment of the present invention comprises agitating the aluminum and water and catalytic substances sufficiently so that the reaction to produce alumina proceeds at a desirable rate. The reaction velocity is dependent upon the temperature of the reactants, the degree of subdivision of the aluminum, the concentration or amount of the mercury promoter, and the degree of agitation given the mixture. Thus a reaction that proceeds slowly at a temperature of 212° F. with only a mild agitation or shaking of the mixture will proceed very rapidly if the mixture is vigorously agitated. At a temperature of 572° F., on the other hand, the reaction proceeds relatively rapidly even with a mild degree of agitation. However, if the mixture is subjected to vigorous agitation, the time necessary for complete reaction is substantially decreased.

A preferred embodiment of the present invention relates to the process for producing hydrated alumina which comprises reacting aluminum with water in the presence of specific catalytic substances added in a specified manner, agitating the mixture to form alumina, maintaining a pressure sufficient to keep at least a portion of the water in the liquid phase, and separately recovering alumina therefrom.

It is a desirable feature of the present invention that liquid water be present and it is thus necessary when temperatures above the boiling point are employed to effect the reaction under sufficient pressure to mainain a liquid phase of water. The critical temperature of water is 705.2° F.; the definition of the critical temperature being that temperature above which a gas cannot be liquefied by pressure alone. It is desirable to use liquid water since it is much easier to have efficient mixing between the aluminum and water accomplished if there is a liquid phase.

In accordance with our invention aluminum is contacted with or reacted with an aqueous solution of an acid. The aluminum may be commingled with water and the acid subsequently added, or the aluminum may be directly commingled with an aqueous solution of the acid. In any event the aluminum is first commingled with water and an acid. The exact role of the acid is not completely known. It is believed that the acid acts as a reactant and also as a catalyst. The acid anions may, by the formation of partial salts, solubilize the surface coating of alumina that is formed by the reaction of aluminum with water causing the aluminum compound to enter into solution and expose more aluminum surface. In solution the soluble aluminum compound may by partial hydrolysis form alumina or aluminum hydroxide or partly neutralized alumina and in part regenerate the acid anion. Again we do not intend our invention to be limited by this theory.

Hydrogen is probably formed by two reactions, one being the reaction of aluminum with the acid to form the aluminum salt and hydrogen, while the second is the reaction of aluminum with water to produce alumina and hydrogen. A mercury promoter is also another essential catalytic substance that is used in our invention. We have found, however, that when a catalytic amount of the acid and a catalytic amount of the mercury promoter are simultaneously added, the reaction proceeds at a vigorous rate which may become quite violent, and, therefore, the catalytic substances must be added slowly or periodically as the reaction proceeds. As hereinbefore mentioned, the rate of the reaction depends upon the amount of acid and mercury promoter added. We have now discovered that when the acid is added prior to the addition of the mercury promoter, the reaction is much more easily controlled and further the amount of mercury promoter necessary to complete the reaction in a specified time is substantially decreased. Our invention, therefore, incorporates the steps of adding the acid prior to the addition of the mercury promoter and by using this procedure, as herein further elaborated upon, the reaction proceeds at a much more desirable rate and the amount of mercury promoter necessary is substantially descreased.

Hydrogen is evolved from the aqueous solution of the acid containing the solid aluminum, and, as hereinbefore mentioned, the hydrogen may be produced by reaction of the acid with the aluminum and by reaction of the aluminum with water. When the aluminum and acidic aqueous solution are commingled, hydrogen is evolved and we have discovered that the benefits of the present invention, which are hereinbefore mentioned, may be most effectively utilized when the mercury promoter is added after about 15%, and before about 75% and preferably before 50% of the hydrogen which is stoichiometrically equivalent to the amount of acid initially present is evolved. For example, if one mol of sulfuric acid is present in the aqueous solution, 15% of the hydrogen which is stoichiometrically equivalent to this amount of acid is 0.15 mol of hydrogen and likewise if one mol of hydrochloric acid is present in the aqueous solution, 15% of the hydrogen which is stoichiometrically equivalent to this amount of acid is 0.075 mol of hydrogen. If the mercury is added before this amount of hydrogen is evolved, the reaction often becomes violent and, further, more mercury promoter is ultimately necessary to complete the reaction in a specified time than when adding the mercury promoter after this amount of hydrogen is evolved. The mercury promoter is added before about 75% and preferably before about 50% of the hydrogen which is stoichiometrically equivalent to the amount of acid initially present is evolved since the reaction proceeds very slowly after this point and full advantage of the addition of the mercury compound is not taken if added later.

The acidic aqueous solution may be achieved by the addition of mineral acids and/or organic acids. These acids are normally added in only small amounts when it is desired to make alumina gel, and in somewhat larger, but below stoichiometric amounts when a sol is being prepared. For example, to make an alumina sol in the presence of hydrochloric acid, an amount of acid above about 0.4 mol per atom of aluminum, and preferably about 0.65 mol per atom of aluminum, may be used, as compared with the stoichiometric amount of 3 mols. To make a gel, amounts of acid one-tenth as large as those used for sol formation, or even less, may be used.

For purposes of alumina gel formation suitable mineral acids comprise the mono-basic acids, hydrogen fluoride, hydrogen chloride, hydrogen iodide, hydrogen bromide, nitric acid, etc.; the di-basic acids, sulfuric acid etc.; and the tribasic acids, phosphoric acid, etc. Suitable organic acids are the poly-basic acids such as for example oxalic acid, malonic acid, succinic acid, maleic acid, phthalic acid, tartaric acid, citric acid, etc. These poly-basic acids result in the desirable gel formation whereas the lower, water soluble mono-basic fatty acids do not. For purposes of gel formation, the acid or mixture thereof must be selected in amounts so that the acid anions to aluminum ratio be, in terms of stoichiometric equivalents, as herein set forth. The mono-basic inorganic acids produce gels when the ratio of mono-valent acid anion is in amounts below 0.13 equivalent of acid anion per equivalent of aluminum, while the bi-valent inorganic acid anion is in amounts such that the ratio is below about 0.5. The polyvalent acid anions produce gels with a higher ratio of bivalent acidic anion of below 1.0 equivalent of acid anion per equivalent of aluminum and higher, however, ratios below about 1.0 are preferred since ratios greater than 1.0 involve the use of excess free acid anion. For example sulfuric acid forms gels with $SO_4^=/Al^{+++}$ ratios of below about 0.5 equivalent of acid anion per equivalent of aluminum while the corresponding maximum for $Cl^-/Al^{+++}$ is about 0.13. For gel formation therefore, the acid is selected from the group consisting of inorganic acids, polybasic or polyvalent organic acids and acid-acting salts in amount so that the monovalent acid anion is in amount below about 0.13 equivalent of acid anion per equivalent of aluminum, the bivalent inorganic acid anion is in amount below about 0.50, the bi-valent organic acid anion is in amount below about 1.0 and the amount of trivalent acid anion is in amount below about 1.0. The bi-valent organic acid anions and higher valent organic and inorganic acid anions form gels above the 0.50 ratio of the dibasic inorganic acids with gels being formed using ratios as high as 5.0, however, ratios much above 1.0 are not preferred since ratios above 1.0 involve the use of excess free acid. Ratios below about 0.01 of any of the acid anions do not effectively catalyze the desired reaction.

For purposes of sol formation suitable inorganic or mineral acids comprise hydrogen chloride, hydrogen iodide, hydrogen bromide, nitric acid, sulfuric acid, etc., or mixture thereof. The amount of acid or mixtures thereof must be such that the anion/aluminum ratio be in terms of equivalents at least 0.13 and generally within the range of from about 0.13 to about 0.75. The monobasic acids produce sols even with the lower ratios within this range, while the bivalent acids require the higher ratios within this range. For example, sulfuric acid forms sols with $SO_4^=/Al^{+++}$ ratios of above about 0.5 equivalent per equivalent while the corresponding minimum for $Cl^-/Al^{+++}$ is about 0.13. The acids which form soluble aluminum salts are those having mono-valent or bivalent anions, and the limiting or lower ratio of anion to aluminum ratio for sol formation (in equivalents of acid anion per equivalent of aluminum) may be broadly given by the formula $$R=(0.13)(4)^{n-1}$$

where $n$=the valence of the anion (1 or 2). For monovalent anions, $R=0.13$; for bivalent, $R=0.52$ or about 0.5. Amounts below this range while possessing sufficient catalytic activity tend to produce alumina gels.

Using different concentrations of acids, therefore, produces alumina either as a gel, a sol or crystals of alumina. At temperatures above about 400° F. crystals of alumina are usually produced. The temperature range in which a fluid gel or sol is produced, therefore, is from about 30° F. to about 400° F. although alumina is produced within the broader range of from about 30° F. to about 705° F.

When at least 15% of the hydrogen which is stoichiometrically equivalent to the amount of acid initially present is evolved by the reaction of aluminum with the acidic solution, the mercury promoter is added. The mixture of mercury promoter and the acidic solution acts as an accelerant to speed the reaction of aluminum with water in order to form the desired alumina. We have found that the mercury compound reacts with the aluminum and is reduced to metallic mercury which then appears to amalgamate with the aluminum. There is a difference in the catalytic effect of the various compounds of mercury and it seems likely that the distribution of the mercury amalgam centers which are probably cathodic is an important feature in determining the reaction velocity. However, we do not intend our invention to be limited by this theory. A comparison between the speed of the reaction when metallic mercury is used as a promoter and a proportional amount of a mercury compound shows a definite advantage for the mercury compound although metallic mercury is itself quite effective. By using the steps of our invention we have discovered that less mercury promoter may be used to achieve the same reaction than when the mercury promoter is initially added to the acidic solution.

Since the mercury promoter acts as an accelerant or a catalyst, it is preferably used in very low concentrations. Any amount of a promoter used as an accelerant or catalyst herein mentioned will be a catalytic amount of mercury or referred to as a catalytic amount. As hereinbefore mentioned the amount of the mercury promoter will usually be within the range of from about 0.05% to about 50% by weight of the aluminum. Concentrations of mercury promoter below this range do not effectively catalyze the reaction, and concentrations above this range often produce undesirable results, for example, the aluminum surface may be so completely amalgamated as to reduce the anodic area sufficiently to decrease the reaction velocity.

The mercury promoter is selected from the following group and may be a mixture of two or more of these mercury promoters: Mercury, mercuric acetate, mercurous acetate, mercuric bromate, mercurous bromate, mercuric bromide, mercurous bromide, mercuric bromide iodide, mercurous carbonate, mercuric chlorate, mercuric chloride, mercurous chloride, mercuric fluoride, mercurous fluoride, mercuric iodide, mercurous iodide, mercuric nitrate, mercurous nitrate, mercuric oxalate, mercuric oxide, mercurous oxide, mercuric sulfate, mercurous sulfate, etc., as well as mercury-nitrogen compounds such as ammono-basic mercuric bromide, ammono-basic mercuric chloride, etc. Almost any other mercury-containing compound may be used and as herein mentioned it may be a mercuric salt, a mercurous salt either organic or inorganic, an oxide of mercury, or a complex of mercury compounds.

Drying the alumina gel at various temperatures produces alumina in various modifications. Drying within the temperature range of from about 30° F. to about 400° F. produces mainly gibbsite alumina. An analysis of the alumina dried at 400° F. shows that the product is chiefly gibbsite, however, small amounts of bohmite, a modification of hydrated alumina, are evidenced. As the temperature of the drying is increased, the percent of bohmite in the product is accordingly increased and at a temperature of approximately 650° F. the product after the drying is analyzed as being almost entirely bohmite.

The reaction of the aluminum with the acidic solution with and without the addition of the mercury promoter may be effected in any suitable type of equipment wherein the reactants are subjected to agitation and preferably to vigorous stirring. The operation may be carried out in continuous or batch-wise fashion. When temperatures above the normal boiling point of water are employed, and the reaction is performed with water in the liquid phase, it is of course necessary that the reaction vessel be capable of withstanding pressures sufficient to maintain a liquid phase of water. In small scale production of alumina by this process a rotating pressure autoclave is satisfactory. When the temperatures employed are at or below the boiling point of water, the reaction may be effected in ordinary open equipment in which a means is provided for vigorous stirring, agitation or circulation of the reactants. It is, however, necessary that the process equipment be constructed of such material that it is not affected by water or aluminum and/or the promoters used so that undesirable elements are not introduced into the desired alumina product; however, if the presence of these foreign substances is not objectionable, the above precautions need not be adhered to. Hydrogen is produced by the reaction of the aluminum with the solution and a means of venting must be provided if the pressure build-up caused by the production of this hydrogen is to be avoided. If the equipment will withstand this additional pressure, however, it is not necessary to vent the hydrogen continuously. The amount of hydrogen evolved may be measured by the pressure build-up on the system and/or the amount of hydrogen vented may be passed through a gas meter and the amount evolved measured in this manner.

The alumina gel formed in this reaction need not be filtered and washed to be ready for use, especially where a subsequent calcination is involved in the use of the alumina. The water washing is unnecessary since no undesirable foreign non-volatile materials need be introduced during the preparation of the alumina. The absence of undesirable foreign materials in the product alumina is in fact a feature of this method of preparation.

The following example is given to further illustrate the novelty and utility of the present invention but not with the intention of unduly limiting the same.

EXAMPLE

HR grade aluminum chips of approximately $\frac{1}{16}''$ to $\frac{3}{32}''$ wide, $\frac{1}{4}''$ long and slightly more than $\frac{1}{16}''$ thick were used to prepare alumina. The purity of the aluminum was checked on an emission spectrograph, which gave the following analysis: 0.004% Fe, 0.005% Cu, 0.005% Mg, 0.02% Si and 0.02% Ca, the rest being aluminum. In run 1, 23.5 grams of these aluminum chips were placed in a 2 liter creased Pyrex flask equipped with 2 water condensers and a 6 bladed Pyrex stirrer. The stirrer speed was controlled at 1500 R. P. M. 0.30 gram of metallic mercury, 47.5 ml. of reagent grade hydrochloric acid and 120.2 grams of distilled water were placed in the flask and brought up to approximately 212° F. before adding the aluminum. A temperature of approximately 212° F. was maintained in the flask by an electric heater. The hydrogen evolved by the reaction of the aluminum was passed through a wet test meter and measured. Run 2 was carried out using the same type of apparatus with the same amounts of water, acid, aluminum, etc., the only difference being that the mercury was not added at the beginning of the run but was added later as shown below in the table.

Table

| Time, Minutes | Gas Evolved in Cu. Ft. @ S. C. | | Aluminum Reacted, grams | | Wt. Percent Aluminum Reacted | |
|---|---|---|---|---|---|---|
| | Run 1 | Run 2 | Run 1 | Run 2 | Run 1 | Run 2 |
| 0 | 0 | 0 | 0 | 0 | 0 | 0 |
| 3 | 0.062 | | 1.41 | | 6.0 | |
| 5 | 0.090 | 0.033 | 2.04 | 0.75 | 8.7 | 3.2 |
| 30 [1] | 0.331 | 0.054 | 7.55 | 1.23 | 32.1 | 5.2 |
| 75 | 0.533 | 0.499 | 12.12 | 11.34 | 51.6 | 48.4 |
| 105 | 0.634 | 0.672 | 14.40 | 15.28 | 61.3 | 65.0 |
| 120 [1] | | 0.744 | | 16.90 | | 72.0 |
| 135 | 0.718 | 0.784 | 16.32 | 17.81 | 69.5 | 75.8 |
| 165 | 0.785 | 0.852 | 17.85 | 19.36 | 76.0 | 82.4 |
| 180 [1] | | 0.882 | | 20.05 | | 85.4 |
| 235 | | 0.951 | | 21.60 | | 92.0 |
| 255 | 0.917 | | 20.85 | | 88.9 | |

[1] 0.1 gram of metallic mercury added in run 2 only.

47.5 ml. of reagent grade HCl with a sp. g. of 1.1851 contains 20.7 grams of HCl or 0.00125 lb. mols of HCl. The stoichiometric equivalent of hydrogen of this amount of acid is 0.00125/2 times 359 or 0.2245 cubic foot of hydrogen at standard conditions. 15% of this amount is 0.0337 cubic foot. The 0.1 gram of mercury was added in run 2 after approximately 0.054 cubic foot of hydrogen was evolved or approximately 24.1% of the hydrogen stoichiometrically equivalent to the amount of acid initially present was evolved. Referring to the data at the end of 3 minutes it may be seen that in run 1, 6.0% of the aluminum reacted in this short time which indicates a vigorous reaction. At the end of five minutes in run 1 8.7% of the aluminum reacted while in run 2 only 3.2% of the aluminum reacted which shows that the presence of mercury accelerates the reaction. In the absence of mercury, the speed of reaction at this initial stage is a direct function of the amount of acid present (or the pH), so that while the initial rate is high it rapidly decreases as acid is consumed. It is an object of this invention to teach the addition of the mercury promoter when the acid-promoted reaction has abated in velocity, so that a continuous high rate is maintained without the difficulties attendant on excessive reaction rates in the early stages, such as occur when both acid and a mercury catalyst are present.

At the end of 30 minutes of reaction in run 2 0.1 gram of metallic mercury was added and the reaction rate thereafter increased. At the end of 75 minutes of reaction in run 1 51.6% of the aluminum reacted and in run 2 48.4% reacted, however, as the reaction continued at the end of 105 minutes 61.3% reacted in run 1 while 65.0% reacted in run 2. Thus when using only ⅓ the amount of mercury in run 2 more reaction has occurred. The benefit of adding the mercury promoter at a later period in the reaction is thus clearly illustrated. In run 2 0.1 gram of mercury is again added at the end of 120 minutes and at the end of 180 minutes. At the end of 165 minutes 82.4% of the aluminum has reacted with only 0.2 gram of mercury while only 76.0% has reacted using the 0.3 gram of mercury in run 1. After 235 minutes of reaction in run 2 more of the aluminum has reacted than at the end of 255 minutes in run 1. The data thus shows that when the mercury promoter is added after at least 15% of the hydrogen which is stoichiometrically equivalent to the amount of acid initially present is evolved, the reaction is further completed with the use of an equal amount of mercury or less mercury may be used to achieve the same amount of reaction, which is of definite economic advantage. The data also show that the reaction will proceed at a faster overall rate when using the method of this invention, while at the same time the reaction velocity in the initial stages is slower and more easily controllable.

The reaction product in both runs 1 and 2 is a clear water-white alumina sol which may be readily gelled and dried to a hard, highly absorptive alumina particularly well adapted to use as a catalyst support.

We claim as our invention:

1. A process for producing alumina which comprises commingling aluminum and an aqueous solution of an acid which is reactable with aluminum to form hydrogen, reacting said solution and aluminum in the absence of mercury until at least 15% of the hydrogen which is stoichiometrically equivalent to the amount of acid initially present is evolved, subsequently adding a promoter comprising mercury, and effecting further reaction in the presence of said mercury and separately recovering alumina therefrom.

2. A method of producing an alumina sol which comprises commingling aluminum and an aqueous solution of a mineral acid which is reactable with aluminum to form hydrogen and a soluble aluminum salt, said acid being in amount of at least 0.13 equivalent of acid anion per equivalent of aluminum, reacting said solution and aluminum in the absence of mercury until at least 15% of the hydrogen which is stoichiometrically equivalent to the amount of acid initially present is evolved, subsequently adding a promoter comprising mercury, and effecting further reaction in the presence of said mercury promoter and separately recovering alumina therefrom.

3. A method of claim 2 further characterized in that said acid is in amount of from about 0.13 to about 0.75 equivalent of acid anion per equivalent of aluminum.

4. A method of producing an alumina gel which comprises commingling aluminum and an aqueous solution of an acid which is reactable with aluminum to form hydrogen, said acid being selected from the group consisting of inorganic acids and poly-basic organic acids in amount so that the mono-valent acid anion is in amount below about 0.13 equivalent of acid anion per equivalent of aluminum and the bivalent inorganic acid anion is in amount below about 0.50, reacting said solution and aluminum in the absence of mercury until at least 15% of the hydrogen which is stoichiometrically equivalent to the amount of acid initially present is evolved, subsequently adding a promoter comprising mercury, and effecting further reaction in the presence of said merury promoter and separately recovering alumina therefrom.

5. A method of producing alumina which comprises mixing aluminum with an aqueous solution of a mineral acid, agitating the mixture, reacting said solution and aluminum in the absence of mercury until at least 15% of the hydrogen which is stoichiometrically equivalent to the amount of acid initially present is evolved, subsequently adding a promoter comprising mercury, continuing the agitation and effecting further reaction in the presence of said mercury promoter and separately recovering alumina therefrom.

6. A method of producing alumina which comprises mixing aluminum with an aqueous solution of a mineral acid, agitating the mixture reacting said solution and aluminum in the absence of mercury until at least 15% of the hydrogen which is stoichiometrically equivalent to the amount of acid initially present is evolved, subsequently adding a promoter comprising mercury in amount of from about 0.02% to about 50% by weight of said aluminum, continuing the agitation and effecting further reaction in the presence of said mercury promoter and separately recovering alumina therefrom.

7. The method of claim 6 further characterized in that the temperature of the reactants is within the range of from about 30° F. to about 705° F.

8. The method of claim 6 further characterized in that said promoter is metallic mercury.

9. The method of claim 6 further characterized in that said promoter is a mercury salt.

10. The method of claim 6 further characterized in that said promoter is an oxide of mercury.

11. A method of producing alumina which comprises mixing aluminum with an aqueous solution of a mineral acid, said acid being in amount less than the stoichiometric amount based on the aluminum present, agitating the mixture, reacting said solution and aluminum in the absence of mercury until at least 15% of the hydrogen which is stoichiometrically equivalent to the amount of acid initially present is evolved, subsequently adding a promoter comprising mercury in amount of from about 0.02% to about 50% by weight of said aluminum, continuing the agitation and effecting further reaction in the presence of said mercury promoter and separately recovering alumina therefrom.

12. In the production of alumina by reacting aluminum and an aqueous acid solution which is reactable with aluminum to form hydrogen, the improvement which comprises effecting the reaction in the absence of mercury until there is evolved at least 15% of the hydrogen which is stoichiometrically equivalent to the amount of acid initially present in said solution, then adding a promoter comprising mercury and carrying the reaction to completion in the presence thereof.

13. The process of claim 12 further characterized in that the acid component of said solution is a mineral acid.

14. The process of claim 12 further characterized in that said solution comprises hydrochloric acid.

References Cited in the file of this patent

UNITED STATES PATENTS

| | | |
|---|---|---|
| 2,274,634 | Heard | Mar. 3, 1942 |
| 2,449,847 | Heard | Sept. 9, 1948 |
| 2,492,167 | Marisic et al. | Feb. 27, 1949 |
| 2,643,935 | Halversen | June 30, 1953 |

FOREIGN PATENTS

| | | |
|---|---|---|
| 667,145 | Great Britain | Feb. 27, 1952 |